SINGLE-SIDEBAND SUPPRESSED CARRIER SIGNAL GENERATOR

Filed July 26, 1961

Thomas Clifton Penn,
Inventor.

3,195,073

SINGLE-SIDEBAND SUPPRESSED CARRIER SIGNAL GENERATOR

Thomas Clifton Penn, Richardson, Tex., assignor to Texas Instruments Incorporated, Dallas, Tex., a corporation of Delaware Filed July 26, 1961, Ser. No. 127,024
8 Claims. (Cl. 332—45)

Figure 1:
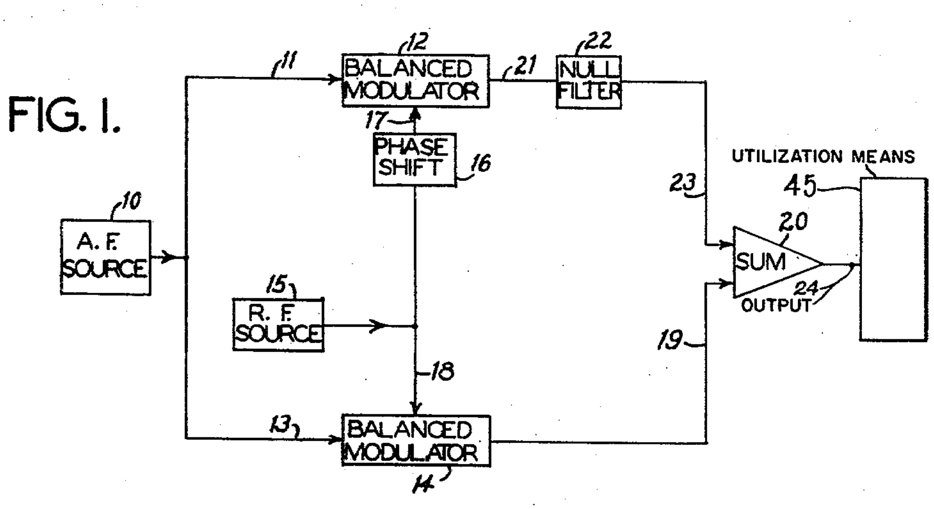

This invention relates to a method and apparatus for generating single-sideband suppressed carrier signals.

One of the earliest methods used to provide single-sideband suppressed-carrier signals was to generate a double-sideband suppressed-carrier signal with a balanced modulator and then to utilize a sharp cut-off bandpass filter to eliminate one of the sidebands. The obvious shortcoming of such a system is that the bandpass filter must have a very steep characteristic in the region of the carrier frequency to avoid attenuating the low audio frequencies. Subsequently, a system was developed which eliminated the need for a sharp bandpass filter by utilizing two balanced modulators, one being driven by audio and carrier signals shifted in phase by 90° with respect to the signals supplied to the other balanced modulator. Upon summing the outputs of the two modulators of such a system only one sideband remains so that a single-sideband suppressed-carrier output is provided. It is difficult, however, to produce a 90° phase shift circuit which provides the proper phase shift for the entire range of audio frequencies as would be necessary in the input of the balanced modulators. The latter system is therefore not entirely acceptable in some applications due to the problem resulting from the necessity of a wide-band phase shifter.

It is therefore the principal object of this invention to provide an improved method and apparatus for generating single-sideband suppressed-carrier signals. Another object is to provide a single-sideband suppressed-carrier signal generator of the type utilizing two balanced modulators, but requiring no wide-band audio-frequency phase shifter. A further object is to provide a single-sideband suppressed-carrier signal generator wherein no sharp cut-off bandpass filter is required to suppress one of the sidebands.

In accordance with this invention, a signal generating method or device is provided which makes use of a pair of balanced modulators as suggested above. A carrier signal is supplied to each of the balanced modulators, the carrier input to one of the modulators being shifted by 90° with respect to the carrier input to the other modulator. The audio or modulation signals for the two modulators are not shifted in phase with respect to one another, however, but are instead applied directly to the appropriate inputs. With this arrangement, each balanced modulator produces a suppressed-carrier output with upper and lower sidebands, the output of one being shifted by 90° in both sidebands. In order to cancel one of the sidebands, the output of one of the balanced modulators may be applied to a filter network having a sharply defined attenuation characteristic at the carrier frequency. For example, an LC tank circuit may be connected in series with the appropriate output line. Such a circuit will exhibit a phase-shift characteristic including a −90° shift for frequencies below the carrier frequency and +90° shift for higher frequencies. Depending upon the Q of the filter network, the phase-shift characteristic will provide a very steep transition between −90° and +90° at the carrier frequency, virtually a step function. If the outputs of the two balanced modulators are then added, one having been altered by the filter network, one of the sidebands will be cancelled, leaving a single-sideband suppressed-carrier signal.

It should be noted that the filter or phase-shift network in the balanced modulator output will have much less stringent design requirements than a wideband audio frequency phase-shift circuit as would be necessary in most of the prior art systems. That is, a phase-shift device for operation at the carrier frequency requires a much narrower bandwidth than at audio frequencies.

Figure 2A:
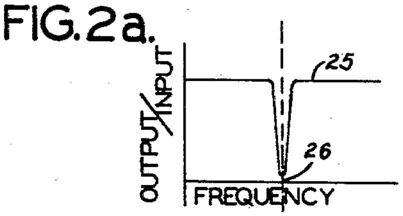
Figure 3:
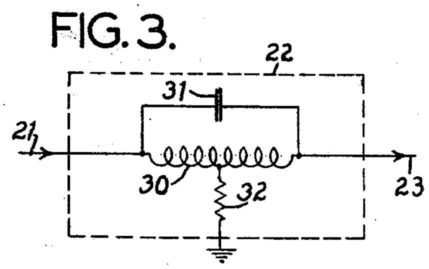
Figure 2B:
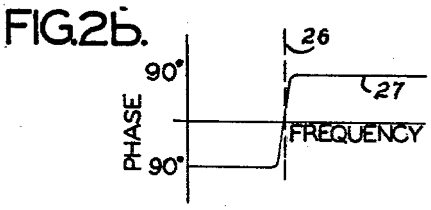
Figure 4:
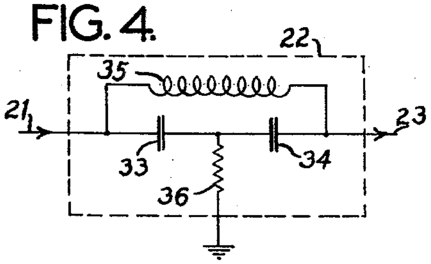
Figure 5:
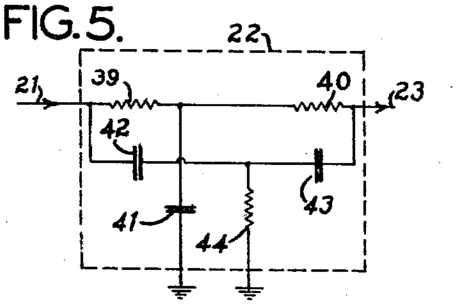

The novel features believed characteristic of this invention are set for in the appending claims. The invention itself, however, as well as further objects and the advantages thereof, may best be understood by reference to the following detailed description of an illustrative embodiment, when read in conjunction with the accompanying drawing, wherein:

FIGURE 1 is a block diagram of a signal generating system incorporating the features of this invention;

FIGURES 2*a* and 2*b* are graphic representations of the characteristics of the null filter in the circuit of FIGURE 1; and FIGURES 3, 4 and 5 are schematic representations of null filters adapted for use in the circuit of FIGURE 1.

With reference to FIGURE 1, a modulator system is illustrated which is adapted to produce single-sideband suppressed-carrier signals in an improved or simpler manner. A source 10 provides audio-frequency modulation signals and is connected to an input 11 of a balanced modulator 12 and to an input 13 of a second balanced modulator 14. The balanced modulators 12 and 14 are of conventional form, and may include a diode bridge arrangement, for example. The carrier input to the balanced modulators 12 and 14 is provided by an RF source or oscillator 15 which is connected through a 90° phase-shift circuit 16 to the carrier input 17 of the balanced modulator 12. Also, the output of the RF source 15 is directly connected, with no phase-shift, to a carrier input 18 of the balanced modulator 14. The output of the balanced modulator 14 will include both upper and lower sidebands in the same phase relationship, but no carrier signal, and is applied directly to an input 19 to a summing device 20. The output of the balanced modulator 12 will include both sidebands, each at a 90° phase position with respect to the output of carrier source 15, and is applied to an input 21 of a null filter 22. The null filter 22 is merely a high Q tank circuit sharply tuned to resonance at the carrier frequency. The output of the null filter 22 is coupled to another input 23 of the summing device 20, which may comprise a conventional summing amplifier. The output of summer 20 is applied to an output terminal 24, from which the output may be applied to a transmitter, a telemetry system, or to other utilization means 45 as may be required.

The null filter 22 may be merely a capacitor and an inductor connected in parallel to form a tank circuit, the values of the inductor and capacitor being selected to provide resonance at the frequency of the carrier signal. The tank circuit would be connected in series between the input line 21 of the filter and the input line 23 of the summing device 20. The characteristics of such a tank circuit are seen in FIGURES 2*a* and 2*b*, where the attenuation characteristics of the filter 22 may be represented by a line 25 having a sharp dip at the resonant frequency 26. The slope of the sides of the attenuation spike will be determined by the Q of the tank circuit and should be as sharp as possible to prevent attenuation of low modulation frequencies. The phase relationship of the output of the null filter 22 with respect to the signal at the input 21 may be represented by a curve 27 of FIGURE 2*b*. The phase shift is seen to be approximately minus 90° at frequencies lower than the resonant frequency since the major portion of the current will flow through the inductor and will lag. Above the center frequency the major current flow will be through the capacitor and will provide a leading or plus 90° phase shift. The slope of the phase shift characteristic in the area of the resonant frequency will again be determined by the Q of the tank circuit. This slope should, of course, be as nearly vertical as possible to prevent distortion of the low modulation frequencies. It is thus seen that the lower sideband from the output of the balanced modulator 12, as it appears at the input 23 of the summing device 20, will be at a minus 90° position while the upper sideband will be at a plus 90° position.

The null filter 22 may take the form of a bridged-T arrangement as seen in FIGURE 3, wherein an inductor 30 is shunted by a capacitor 31 and a centertap on the inductor is connected to ground by a resistor 32. Alternatively, the null filter 22 may take the form of a bridged-T LC circuit as seen in FIGURE 4, wherein a pair of capacitors 33 and 34 are shunted by an inductor 35, the junction of the two capacitors being connected to ground through a resistor 36. If it is preferable to avoid the use of inductors in the circuit, a twin-T resistance-capacitance network may be used as the null filter 22 as seen in FIGURE 5. In this arrangement, a pair of series resistors 39 and 40 are connected between the input 21 of the null filter and the input 23 of the summing device 20, the junction of the resistors being connected to ground through a capacitor 41. A pair of series capacitors 42 and 43 shunt the resistors 39 and 40 while the junction of these capacitors is grounded through a resistor 44. The values of the circuit components are selected to provide a null at the carrier frequency in accordance with conventional design techniques. Each of the filters shown in FIGURES 3, 4 and 5 have characteristics similar to that illustrated in FIGURES 2*a* and 2*b*.

In the operation of the modulator system of FIGURE 1, the output of the balanced modulator 14 will include both upper and lower sidebands and may be expressed as $[E_mE_c \sin (W_c+W_m)t+E_mE_c \sin (W_c-W_m)t]$. On the other hand, the output of the balanced modulator 12, as it appears at the input 21, may be expressed as $$[E_mE_c \sin (W_c+W_m+90°)t + E_mE_c \sin (W_c-W_m+90°)t]$$

where $E_m$ and $E_c$ are the peak amplitudes of the modulation signal and carrier signal, respectively; $W_c$ and $W_m$ are the modulating and carrier frequencies, respectively, expressed in radians per second. After passing through the null filter 22, the latter expression will be modified by adding a plus 90° phase-shift to the upper sideband and by adding a −90° to the lower sideband so that the upper and lower sidebands appearing at the input 23 to the summer 20 may be expressed as $$[E_mE_c \sin (W_c+W_m+180°)t+E_mE_c \sin (W_c-W_m)t]$$

The sum of the inputs on the lines 19 and 23, as expressed above appear at the output 24 and may be expressed as $[2E_mE_c \sin (W_c-W_m)t]$. This is seen to be the lower sideband only, the upper sideband components being 180° out of phase and, therefore, cancelling in the summing device 20.

The system of FIGURE 1 may be modified to provide the upper sideband only, rather than the lower sideband, by merely placing the phase shifter 6 between the RF source 15 and the input 18 of the balanced modulator 14, rather than in the carrier input of the balanced modulator 12 as illustrated.

While this invention has been described with reference to particular embodiments, this description is not meant to be construed in a limiting sense. It is, of course, understood that various modifications may be made by persons skilled in the art, and so it is contemplated that the appended claims will cover any such modifications as fall within the true scope of the invention.

What is claimed is:

1. Apparatus for generating single-sideband suppressed carrier signals comprising first and second balanced modulators, each of said modulators having a modulating signal input and a carrier signal input, a modulating signal source having an output connected to the modulating signal input of each of said first and second balanced modulators, a carrier signal source having an output connected to the carrier signal input of said second balanced modulator and further connected through a quadrature phase-shift circuit to the carrier signal input of said first balanced modulator, summing means having first and second inputs, a filter network having a center frequency equal to said carrier frequency and having an input connected to the output of said first balanced modulator, said output exhibiting a signal comprising a suppressed carrier and the two sidebands thereof, and said filter network having an output connected to said first input of said summing means, the filter network providing a positive 90° phase shift for one sideband of the output of the first balanced modulator and a negative 90° phase shift for the other sideband of such output, the output of said second balanced modulator being connected to said second input of said summing means, and utilization means connected to the output of said summing means.

2. Apparatus according to claim 1 wherein said filter network is an inductance-capacitance tank circuit.

3. Apparatus according to claim 1 wherein said filter network is a resistance-capacitance twin-T circuit.

4. Signal generating apparatus comprising a source of carrier signals, a source of modulation signals, a pair of balanced modulators, said sources being connected to inputs of said balanced modulators, a quadrature phase-shift device being interposed between said source of carrier signals and one of said balanced modulators, a combining device having two inputs, the outputs of said balanced modulators being coupled to said inputs of said combining device, and a filter network having a center frequency equal to the frequency of said source of carrier signals, said filter network being interposed between one of said balanced modulators and said combining device, the filter network providing a positive 90° phase shift for frequencies above the center frequency and a negative 90° phase shift for frequencies below the center frequency.

5. Apparatus according to claim 4 wherein said filter network is a parallel inductance-capacitance circuit connected in series between said one of said balanced modulators and said combining device.

6. In signal generating apparatus, a pair of signal sources, a pair of balanced modulators, said signal sources being connected to said balanced modulators, a 90° phase-shift device being interposed between one of said signal sources and one of said balanced modulators, a combining device, the outputs of said balanced modulators being connected to the inputs of said combining device, a translating network being interposed between the output of one of said balanced modulators and said combining device, said translating circuit exhibiting a phase-shift characteristic of −90° below a given frequency and +90° above said given frequency.

7. Signal generating apparatus comprising a source of carier signals, a source of modulation signals, a first balanced modulator having one input connected to said source of carrier signals and another input connected to said source of modulation signals, a quadrature phase-shift device, a second balanced modulator having one input connected to said source of carrier signals through said phase-shift device and having another input connected to said source of modulation signals, a combining device having a pair of inputs, the output of one of said balanced modulators being connected to one of the inputs of said combining device, a translating device exhibiting a phase-shift characteristic including an output in a first quadrature position for frequencies less than the frequency of said carrier signals and in a second quadrature position for frequencies above the frequency of said carrier signals, the output of the other of said balanced modulators being connected to the other of the inputs of said combining device through said translating device, and utilization means connected to said combining device to receive the output thereof.

8. Apparatus for modulating a carrier signal with an audio signal to produce a single sideband suppressed carrier output, comprising means for providing first and second carrier signals in phase quadrature with each other, an audio signal source, a first balanced modulator, a second balanced modulator, said first balanced modulator being connected to said audio signal source and to said means, thereby to mix said first carrier signal with said audio signal, said second balanced modulator being connected to said source of audio signal and also to said means, thereby to mix said second carrier signal with said audio signal, means connected to the output of said first balanced modulator, said output exhibiting a signal comprising a suppressed carrier frequency and two sidebands, said second-mentioned means shifting the phase of one sideband by +90° and the other sideband by −90°, and combining means having inputs connected to the outputs of the second mentioned means and the second balanced modulator for adding signals present at such inputs to produce a single sideband suppressed carrier output.

References Cited by the Examiner

UNITED STATES PATENTS

| | | | |
|---|---|---|---|
| 2,020,409 | 11/35 | Green | 332—45 |
| 2,248,250 | 7/41 | Peterson | 332—45 |
| 2,392,476 | 1/46 | Hodgson | 332—45 |
| 2,960,573 | 11/60 | Hodgson | 332—45 |

ROY LAKE, *Primary Examiner.*

ROBERT H. ROSE, *Examiner.*